United States Patent
Werner et al.

(10) Patent No.: US 6,376,567 B1
(45) Date of Patent: Apr. 23, 2002

(54) POLYISOCYANATE COMPOSITIONS AND A PROCESS FOR THE PRODUCTION OF LOW-DENSITY FLEXIBLE FOAMS WITH LOW HUMID AGED COMPRESSION SETS FROM THESE POLYISOCYANATE COMPOSITIONS

(75) Inventors: Joachim Werner, Dormagen (DE); Ronald Zibert, Burgettstown, PA (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/732,069

(22) Filed: Dec. 7, 2000

(51) Int. Cl.$^7$ .............................................. C08G 18/10
(52) U.S. Cl. .................. 521/159; 521/130; 521/174; 560/26; 560/330; 560/336; 560/359
(58) Field of Search .......................... 521/159, 174, 521/130; 560/26, 330, 336, 359

(56) References Cited

U.S. PATENT DOCUMENTS

| | | | |
|---|---|---|---|
| 3,067,148 A | * | 12/1962 | Sandridge et al. |
| 3,152,162 A | * | 10/1964 | Fischer et al. |
| 3,384,643 A | * | 5/1968 | Sayigh et al. |
| 3,394,165 A | * | 7/1968 | McClellan et al. |
| 3,449,256 A | * | 6/1969 | Farrissey, Jr. ............ 252/182 |
| 3,640,966 A | * | 2/1972 | Hennig et al. |
| 3,641,093 A | * | 2/1972 | Brooks et al. |
| 3,644,457 A | * | 2/1972 | König et al. |
| 3,674,828 A | * | 7/1972 | Brooks et al. |
| 3,701,796 A | * | 10/1972 | Saaty et al. |
| 3,948,825 A | * | 4/1976 | Pray |
| 4,014,935 A | | 3/1977 | Ibbotson |
| 4,031,026 A | | 6/1977 | Ibbotson |
| 4,055,548 A | | 10/1977 | Carleton et al. |
| 4,088,665 A | | 5/1978 | Findeisen et al. |
| 4,102,833 A | | 7/1978 | Salisbury ................ 521/159 |
| 4,115,429 A | | 9/1978 | Reiff et al. |
| 4,118,411 A | | 10/1978 | Reiff et al. |
| 4,154,752 A | | 5/1979 | Sundermann et al. |
| 4,229,347 A | | 10/1980 | Holt et al. |
| 4,239,856 A | | 12/1980 | Rowton .................... 521/118 |
| 4,256,849 A | | 3/1981 | Ick et al. ................. 521/129 |
| 4,261,852 A | | 4/1981 | Carroll et al. ............ 528/59 |
| 4,321,333 A | | 3/1982 | Alberino et al. ......... 521/159 |
| 4,332,742 A | | 6/1982 | Allen |
| 4,365,025 A | | 12/1982 | Murch et al. ............. 521/159 |
| 4,448,904 A | | 5/1984 | Dominguez ............... 521/160 |
| 4,478,960 A | | 10/1984 | Buethe et al. ............. 521/160 |
| 4,490,300 A | | 12/1984 | Allen et al. |
| 4,490,301 A | | 12/1984 | Pantone et al. |
| 4,490,302 A | | 12/1984 | Ma et al. |
| 4,525,490 A | | 6/1985 | Smith ....................... 521/124 |
| 4,539,156 A | | 9/1985 | Dewhurst et al. |
| 4,539,157 A | | 9/1985 | Dewhurst et al. |
| 4,539,158 A | | 9/1985 | Dewhurst et al. |
| 4,644,018 A | | 2/1987 | Bowditch et al. ......... 521/130 |
| 4,876,292 A | | 10/1989 | Milliren .................... 521/159 |
| 4,910,333 A | | 3/1990 | Slack ....................... 560/351 |
| 5,070,114 A | | 12/1991 | Watts et al. ............... 521/159 |
| 5,240,635 A | | 8/1993 | DeGenova et al. ..... 252/182.21 |
| 5,246,977 A | | 9/1993 | Mussini .................... 521/159 |
| 5,266,604 A | | 11/1993 | Spertini ................... 521/129 |
| 5,350,778 A | | 9/1994 | Steppan et al. .......... 521/159 |
| 5,399,594 A | | 3/1995 | Huygens ................... 521/172 |
| 5,430,072 A | | 7/1995 | Muller et al. ............. 521/159 |
| 5,530,034 A | * | 6/1996 | Narayan et al. .......... 521/159 |
| 5,563,232 A | | 10/1996 | Hurley et al. ............ 528/60 |
| 5,585,452 A | | 12/1996 | Hurley et al. ............ 528/67 |
| 5,698,609 A | * | 12/1997 | Lockwood et al. ....... 521/174 |
| 5,877,227 A | | 3/1999 | Murty ..................... 521/159 |
| 6,077,456 A | | 6/2000 | Narayan ................... 252/182.22 |
| 6,090,864 A | | 7/2000 | Narayan et al. .......... 521/159 |
| 6,130,268 A | * | 10/2000 | Murray .................... 521/174 |
| 6,133,481 A | * | 10/2000 | Singh et al. .............. 521/159 |

* cited by examiner

Primary Examiner—John M. Cooney, Jr.
(74) Attorney, Agent, or Firm—Joseph C. Gil; N. Denise Brown

(57) ABSTRACT

This invention relates to novel polyisocyanate compositions, to a process for these polyisocyanate compositions, to a process for the production of cold cure flexible molded foams wherein this novel polyisocyanate composition comprises the polyisocyanate component, and to the cold cure flexible molded foams produced by this process. The novel polyisocyanate compositions of the present invention are characterized by an NCO group content of more than about 15%, (preferably from about 20% to less than about 33%, more preferably from about 25% to about 32%), and comprising: (1) from about 70 to 99% by weight of a polymethylene poly(phenyl isocyanate) having an NCO group content of from about 30 to about 33%, and a monomer content of from about 40% to about 90% by weight and (2) from about 1 to about 30% by weight of a prepolymer of diphenylmethane diisocyanate having an NCO group content of from about 2% to about 20%, and comprising the reaction product of: (a) diphenylmethane diisocyanate; and (b) a polyether polyol.

22 Claims, No Drawings

POLYISOCYANATE COMPOSITIONS AND A PROCESS FOR THE PRODUCTION OF LOW-DENSITY FLEXIBLE FOAMS WITH LOW HUMID AGED COMPRESSION SETS FROM THESE POLYISOCYANATE COMPOSITIONS

BACKGROUND OF THE INVENTION

This invention relates to novel polyisocyanate compositions, to a process for the production of these polyisocyanate compositions, to a process for the production of cold cure flexible molded foam wherein the isocyanate component comprises the polyisocyanate composition of the present invention, and to the cold cure flexible molded foams produced by this process.

Mixtures of diisocyanates based on diphenylmethane diisocyanate (MDI) and polymethylene poly(phenyl isocyanate) (i.e. polymeric MDI or PMDI), and prepolymers based on such mixtures are known and described in the art. The use of these mixtures of diisocyanates based on MDI and polymeric MDI or PMDI, and prepolymers based on such mixtures in the art of manufacturing flexible polyurethane foam is also known and described in, for example, U.S. Pat. Nos. 4,239,856, 4,256,849, 4,261,852 and 4,365,025.

Numerous patents have issued which describe mixtures of diphenylmethane diisocyanates (MDI), polymethylene poly (phenyl isocyanate), and prepolymers based on these mixtures. See, for example, U.S. Pat. Nos. 3,152,162, 3,644,457, 3,701,796, 4,055,548, 4,118,411, 4,154,752, 4,177,205, 4,261,852, 4,442,235, 4,478,960, 4,490,302, 4,910,333, 5,070,114, 5,240,635, 5,246,977, 5,266,604, 5,350,778, 5,399,594, 5,563,232, 5,585,452, 5,877,227, 6,077,456 and 6,090,864.

It is known that MDI can be readily liquefied through carbodiimidization. Typical of this process are the processes described in U.S. Pat. Nos. 3,152,162, 3,384,643, 3,449,256, 3,640,966, 3,641,093, 3,701,796, 4,014,935, 4,088,665, 4,154,752, and 4,177.205.

It is also known, although less common, that MDI can be reacted with N,N-di-(2-hydroxy-propyl)aniline (as described in U.S. Pat. No. 3,394,165) and heating with N,N'-disubstituted thioureas (as described in U.S. Pat. No. 3,674,828).

A well known and common reaction of MDI is with various hydroxyl functional materials. Thus, the prior art has described several types of liquid isocyanates:

1) reaction products of MDI with poly-1,2-propylene ether glycols having molecular weights of from 134 to 700 (U.S. Pat. No. 3,644,457);
2) reaction products of MDI with a mixture of alkylene glycols containing at least three carbon atoms (U.S. Pat. Nos. 3,883,571 and 4,229,347);
3) mixtures of i) 30 to 80% by weight MDI, ii) 5 to 25% by weight MDI uretonimine-containing derivatives, iii) 20 to 50% by weight reaction products of MDI with diols or mixtures of diols having molecular weights of less than 175, and iv) 0 to 10% by weight polymethylene poly(phenyl isocyanates) (U.S. Pat. No. 4,031,026);
4) reaction products of polyoxyethylene glycols of molecular weight of from 200 to 600 and polymethylene poly(phenyl isocyanates) containing from 65 to 85% by weight of MDI, with the balance being higher homologues (U.S. Pat. No. 4,055,548);
5) reaction products of MDI with polyols having molecular weights of from 240 to 1500 and functionalities of from 2.7 to 3.3 (U.S. Pat. No. 4,102,833);
6) reaction products of MDI (of various 2,4'-isomer contents) with propylene glycol or poly-1,2-propylene ether glycols (U.S. Pat. No. 4,118,411) or with polyoxyethylene glycols (U.S. Pat. No. 4,115,429);
7) mixtures of i) 50 to 90% by weight reaction products of MDI and blends of 50 to 100% by weight of polyoxypropylene diols or triols having equivalent weights of from 750 to 3000 and 0 to 50% by weight polyoxyethylene diols or triols having equivalent weights of from 750 to 3000, and ii) 10 to 50% by weight of polymethylene poly(phenyl isocyanate) containing 30 to 65% of diphenylmethane diisocyanate (U.S. Pat. No. 4,261,852);
8) mixtures of i) reaction products of MDI and a polyol blend of a polyol having a molecular weight of at least 1000 and a polyol having a molecular weight of from 115 to 300 and ii) liquefied MDI (U.S. Pat. No. 4,321,333);
9) reaction products of MDI and an N-substituted ethanolamine (U.S. Pat. No. 4,332,742);
10) reaction products of MDI containing from 10 to 20% by weight of the 2,4-isomer and a 5500 molecular weight polyether triol (U.S. Pat. No. 4,448,904);
11) reaction products of MDI with a phenyl-substituted alkane diol (U.S. Pat. No. 4,490,300) or with a monoallyl ether of trimethylol-propane (U.S. Pat. No. 4,490,301);
12) reaction products of MDI with a mixture of a monohydroxyl compound, a poly-1,2-propylene glycol and a low molecular weight triol (U.S. Pat. No. 4,490,302);
13) reaction products of MDI of various isomer contents with 1,3-butane diol and propylene glycol (U.S. Pat. No. 4,539,156), with neopentyl glycol and propylene glycol (U.S. Pat. No. 4,539,157) and 1,3-butane diol and neopentyl glycol (U.S. Pat. No. 4,539,158);
14) reaction products of MDI with amines and tripropylene glycol (U.S. Pat. No. 4,883,909);
15) reaction products of MDI high molecular weight polyols and tripropylene glycol (U.S. Pat. Nos. 4,442,235 and 4,910,333 );
16) mixtures of i) reaction products of MDI and a polyol of equivalent weight of from 30 to 600 and ii) polymethylene poly(phenyl isocyanates) (U.S. Pat. No. 5,240,635); and
17) mixtures of i) reaction products of MDI and polyoxytetramethylene glycols of equivalent weight of from 250 to 1500, and ii) up to 30% by weight of a second isocyanate which can be the 2,4'-isomer or a polymethylene poly(phenyl isocyanate) (U.S. Pat. No. 5,246,977).

Other liquid isocyanate compositions are described in U.S. Pat. Nos. 4,365,025, 4,525,490, 4,644,018, 5,070,114, 5,266,604 and 5,430,072.

The liquid isocyanates of U.S. Pat. No. 4,365,025 are prepolymers prepared from (a) a mixture of MDI and PMDI having a functionality of greater than 2.0, and (b) one or more polyols having 2 to 3 hydroxyl groups and at least about 50% by weight of oxyethylene groups, wherein the ratio of NCO equivalents to hydroxyl equivalents is from 1.5:1 to 5:1.

U.S. Pat. No. 5,070,114 describes a liquid isocyanate-containing prepolymer having an NCO functionality greater than 2 and an NCO content of from 2 to 12%. These are prepared by reacting (i) an isocyanate-reactive polymer having a nominal functionality of 2 to 4 and an average equivalent weight of about 500 to about 5,000, with (ii) a stoichiometric excess of a MDI composition having an average functionality of from 2 to 2.3 and containing at least 2% by weight of the 2,4'-isomer of MDI.

U.S. Pat. No. 5,266,604 discloses a liquid polyisocyanate prepolymer having a free NCO-group content of from 2 to 15% by weight. These prepolymers comprise the reaction products of an isocyanate-reactive polymer having a nominal functionality of 2 to 6 and an equivalent weight of 500 to 5,000 with a stiochiometric excess of a polyisocyanate. Flexible polyurethane foams can be prepared from these prepolymers by reaction with an isocyanate-reactive composition comprising at least 50% by weight water.

Liquid isocyanate-terminated prepolymers are also disclosed by U.S. Pat. No. 5,399,594. These are characterized by a functionality of 2 or more and have an NCO content of 2 to 15%. The prepolymers are reaction products of an isocyanate-reactive polymer having a functionality of 2 to 6 and an equivalent weight of 750 to 5,000, with a stoichiometric excess of an MDI having an average functionality of 2 to 2.3. Flexible foams can also be prepared from these prepolymers.

A homogenous mixture of two polyisocyanates is disclosed by U.S. Pat. No. 5,430,072. One of the polyisocyanate components is a prepolymer having an NCO group content of from 2 to 15% by weight, and is the reaction product of an isocyanate-reactive compound having a nominal functionality of 2 to 8 and an equivalent weight of 500 to 5,000 with a stoichiometric excess of a MDI composition. The other isocyanate in the homogeneous mixture has an NCO group content of at least 25% by weight. This homogeneous mixture of isocyanates can be used to form flexible polyurethane foams by reaction with an isocyanate-reactive component which is at least 40% by weight water.

The polyisocyanate compositions of U.S. Pat. No. 5,877,227 comprise a semi-prepolymer which is the reaction product of an excess of a base isocyanate formulation with 5 to 50% by wt. of a first polyoxypropylene polyoxyethylene polyol, having a nominal functionality of 2 to 4, a molecular weight of 1,000 to 8,000 and an EO content of about 0 to 30% by wt. The base isocyanate formulation comprises a mixture of MDI and PMDI; wherein the MDI comprises 21 to 35% of 2,4'-MDI, 63 to 79% of 4,4'-MDI and 0 to 2% of 2,2'-MDI; and the base isocyanate formulation has a functionality of 2.07 to 2.12. This polyisocyanate composition is disclosed as being suitable for the preparation of flexible open celled polyurethane foam prepared by reaction with an isocyanate-reactive component and water as the sole blowing agent.

U.S. Pat. No. 5,877,227 describes the technology used to make the prepolymer used in the comparative example of the present application. Differences between this prepolymer and the prepolymers of the presently claimed invention include 1) the ethylene oxide (EO) content of the polyol, i.e. the present invention requires >50% of EO in the polyol, and 2) the NCO group content of the prepolymer (the present invention requires <20% NCO), followed by blending with polymeric MDI (i.e. a different process of producing the prepolymer).

Liquid polyisocyanate prepolymer compositions are also disclosed in U.S. Pat. No. 6,077,456. These prepolymers have an NCO group content of 10 to 31%, and comprise the reaction product of an organic polyisocyanate blend and a polyoxyalkylene polyol. Suitable polyisocyanate blends comprise A) diphenylmethane diisocyanate having 50 to 95% by weight of the 4,4'-isomer, from 5 to 50% by weight of the 2,4'-isomer and less than 10% by weight of the 2,2'-isomer; B) a polymethylene polyphenyl polyisocyanate comprising 30 to 70% by weight of MDI, with the balance being PMDI, and having a functionality greater than 2, and C), optionally, a uretonimine-carbodimide modified diisocyanate comprising 10 to 35% by wt. uretonimine-carbodiimide species, with the balance consisting essentially of pure 4,4'-MDI. Suitable polyoxyalkylene polyols for this process include those having molecular weight of 700 to 10,000 and average functionalities of 1.6 to 3.

U.S. Pat. No. 6,090,864 discloses polymeric MDI prepolymer compositions and their use in the preparation of flexible foams. These prepolymers comprise the reaction product of (a) a polymethylene polyphenyl polyisocyanate and (b) a polyether polyol having an average hydroxyl equivalent weight of at least about 700, and are characterized as having an average viscosity of between 400 and 7,000 cps at 25° C.

In the production of flexible foams, typical isocyanate-reactive materials include (1) mixtures of polyether triols having molecular weights of 2,000 to 7,000 with diethanolamine as described in, for example, U.S. Pat. No. 4,239,856; (2) mixtures of polyethers having primary hydroxyl groups having molecular weights of 400 to 10,000 with mixtures of low molecular weight active hydrogen containing materials (U.S. Pat. No. 4,256,849); (3) polyoxypropylene or poly(oxypropylene-oxyethylene)diols or triols having equivalent weights of 700 to 2,000 as described in, e.g. U.S. Pat. No. 4,261,852, and (4) water (see U.S. Pat. No. 4,365,025).

It is also known to use various low molecular weight crosslinkers in the manufacture of flexible foams. U.S. Pat. No. 3,067,148 describes the use of tetrahydric compounds derived from ethylene diamine and alkylene oxides. U.S. Pat. No. 3,948,825 discloses the use of reaction products of methylene dianiline and alkylene oxides; and U.S. Pat. No. 4,569,952 describes the use of an addition product of an alkylene oxide and an aromatic diamine and a mixture of the addition product with an alkanolamine.

Amines such as, for example, Dytek A which is commonly described as 2-methylpentamethylenediamine, are also known and disclosed as being suitable chain extenders for polyurethane flexible foams.

While many foam formulations based on MDI and PMDI provide adequate properties for many applications, it is generally difficult to have good processability over a broad isocyanate index range. In addition, it would be desirable to develop a flexible foam exhibiting high tear strength, high elongation, and low compression set for automotive seating and headrests, as well as non-automotive seating applications.

Advantages of the present polyisocyanate composition vs. state-of-the art prepolymers with comparable MDI isomer composition include the fact that the polyisocyanate compositions of the present invention can be used to prepare flexible foams which exhibit improved (i.e. reduced) compression set and humid aged compression set properties, and improved (i.e. increased) tear strengths, while maintaining sufficiently high hardness. The concept of blending a low-NCO prepolymer with a monomeric-polymeric MDI allows for variability in optimizing these properties by virtue of varying mix ratios of A(1) and A(2) of the present invention as set forth in the claims.

SUMMARY OF THE INVENTION

This invention relates to novel polyisocyanate compositions, to a process for the production of these polyisocyanate compositions, to a process for the production of flexible foams and of cold cure flexible molded foams, and to the resultant flexible foams and cold cure flexible molded foams.

The polyisocyanate compositions of the present invention are characterized by an NCO group content of more than about 15%, preferably from about 20% to less than about 33%, and most preferably from about 25% to about 32%. These compositions comprise:

(1) from about 70 to 99% by weight, based on 100% by weight of components (1) and (2), of a polymethylene poly(phenyl-isocyanate) having an NCO group content of from about 30 to about 33%, and a monomer content of from about 40% to about 90%, wherein the monomer comprises less than about 8% by weight of 2,2'-diphenylmethane diisocyanate, from about 10 to about 50% by weight of 2,4'-diphenylmethane diisocyanate, and from about 50 to about 90% by weight of 4,4'-diphenylmethane diisocyanate, with the %'s by weight of the 2,2'-, 2,4'- and 4,4'-isomer of diphenylmethane diisocyanate totaling 100% by weight of the monomer content; and (2) from about 1 to about 30% by weight, based on 100% by weight of (1) and (2), of a prepolymer of diphenylmethane diisocyanate having an NCO group content of from about 2% to about 20%, and comprising the reaction product of:

(a) diphenylmethane diisocyanate comprising no more than about 3% by weight of the 2,2'-isomer, from about 0.1 to about 60% by weight of the 2,4'-isomer and from about 40 to about 99.9% by weight of the 4,4'-isomer, with the %'s by weight of the 2,2'-, 2,4'- and 4,4'-isomers totaling 100% by weight; and (b) at least one polyether polyol having a functionality of at least 2, a molecular weight of 500 to 10,000, and an OH number of 10 to 400, and being prepared by reacting a suitable initiator compound with ethylene oxide and propylene oxide in a weight ratio of EO:PO of 50:50 to 90:10.

The process of producing the polyisocyanate compositions of the present invention comprises (A) mixing (2) from about 1 to about 30% by weight of a prepolymer of diphenylmethane diisocyanate having an NCO group content of from about 2 to about 20% by weight, with (1) from about 70 to 99% by weight of a polymethylene poly(phenyl isocyanate) having an NCO group content of from about 30 to about 33% by weight, and a monomer content of from about 40 to about 90% by weight. The prepolymers of diphenylmethane diisocyanate are reaction products of (a) diphenylmethane diisocyanate and (b) at least one polyether polyol as described hereinabove. The monomer content of component (1) the polymethylene poly(phenyl isocyanate) comprises less than about 8% of the 2,2'-isomer of MDI, from about 10 to about 50% by weight of the 2,4'-isomer of MDI, and from about 50 to about 90% of the 4,4'-isomer of MDI, with the %'s by weight of the 2,2'-, 2,4'- and 4,4'-isomer of diphenylmethane diisocyanate totaling 100% by weight of the monomer content.

The present invention also relates to a process for the production of a cold cure flexible molded foam. This process comprises (I) reacting (A) the polyisocyanate composition having an NCO group content of more than about 15% which comprises (1) from about 70 to about 99% by weight of a polymethylene poly(phenyl isocyanate) having an NCO group content of about 30 to about 33%, and a monomer content of from about 49 to about 90% by weight, and (2) from about 1 to about 30% by weight, of a prepolymer of diphenylmethane diisocyanate having an NCO group content of from about 2% to about 20%, and which comprises the reaction product of (a) diphenylmethane diisocyanate and (b) at least one polyether polyol; and (B) an isocyanate-reactive component comprising: (1) at least one polyether polyol having a molecular weight of 400 to 14,000, a number average functionality of 2 to 6, and an OH number of about 10 to about 850; and, optionally, (2) a low molecular weight isocyanate-reactive component capable of chain extending and/or crosslinking, and which contains from 2 to 6 reactive groups capable of reacting with isocyanate groups, and having a molecular weight of 32 to 399; in the presence of (C) at least one blowing agent comprising water; and, optionally (D) one or more additives. In this process, the total amount of water present is from about 1% to about 10% by weight, preferably from about 2% to about 6% by weight, based on the total weight of component (B)(1). Suitable (A) polyisocyanate compositions are as described above.

The present invention is also directed to the cold cure flexible molded foams produced by the above process.

DETAILED DESCRIPTION OF THE INVENTION

The polyisocyanate compositions of the present invention are characterized by an NCO group content of more than about 15%, preferably from about 20% to less than about 33%, and most preferably from about 25% to about 32%. These polyisocyanate compositions comprise:

(1) from about 70 to about 99% by weight, and preferably from about 85% to about 95% by weight, based on 100% by weight of components (1) and (2), of a polymethylene poly(phenyl isocyanate) having an NCO group content of from about 30 to about 33%, and a monomer content of from about 40% to about 90% by weight; and (2) from about 1 to about 30% by weight, and preferably from about 5% to about 15% by weight, based on 100% by weight of components (1) and (2), of a prepolymer of diphenylmethane diisocyanate having an NCO group content of from about 2% to about 20% and preferably from about 5% to about 15%.

Suitable polymethylene poly(phenyl isocyanates) for component (1) of the polyisocyanate compositions of the present invention include those having an NCO group content of from about 30 to about 33%, preferably from about 31 to about 33%, and a monomer content of from about 40% to about 90% by weight, preferably from about 60% to about 90% by weight, and most preferably from about 70% to about 85% by weight. The monomer comprises less than about 8% by weight of 2,2'-diphenylmethane diisocyanate, from about 10 to about 50% by weight of 2,4'-diphenylmethane diisocyanate, and from about 50% to about 90% by weight of 4,4'-diphenylmethane diisocyanate, with the %'s by weight of the 2,2'-, the 2,4'- and the 4,4'-isomers of diphenylmethane diisocyanate totaling 100% by weight of the monomer content. It is preferred that the monomer content comprises less than about 2% by weight of the 2,2'-isomer of MDI, from about 15% to about 35% by weight of the 2,4'-isomer of MDI and from about 63% to about 85% by weight of the 4,4'-isomer of MDI, with the %'s by weight of the 2,2'-, the 2,4'- and the 4,4'-isomers totaling 100% by weight of the monomer content.

The polymeric MDI content of this component is from about 10% to about 60% by weight, preferably from about 10% to about 40% by weight, and most preferably from about 15% to about 30% by weight.

As used herein, the term polymeric MDI (PMDI) refers to higher ring compounds of the MDI series, i.e. the three-ring and higher ring products derived by the phosgenation of aniline-formaldehyde condensation products.

Suitable prepolymers to be used as component (2) in the polyisocyanate compositions of the present invention are characterized by an NCO group content of from about 2% to about 20%, and preferably from about 5% to about 15%. This component should be liquid and pourable at 50-60° C. or below. These prepolymers comprise the reaction product of:

(a) diphenylmethane diisocyanate comprising no more than about 3%, preferably no more than about 1% by weight of the 2,2'-isomer, from about 0.1% to about 60%, preferably from about 0.1 to about 2% by weight of the 2,4-isomer, and from about 40 to about 90%, preferably from about 97 to about 99% by weight of the 4,4'-isomer, with the sum of the %'s by weight of the 2,2'-, the 2,4'- and the 4,4'-isomers totaling 100% by weight; and (b) at least one polyether polyol having a functionality of at least 2, preferably from about 3 to about 6, a molecular weight of 500 to 10,000, preferably of 1,000 to 6,000, and an OH number of 10 to 400, preferably of 20 to 200, and being prepared by reacting a suitable initiator compound with ethylene oxide and propylene oxide in a EO:PO weight ratio of 50:50 to 90:10, preferably of 60:40 to 90:10 and more preferably of about 65:35 to about 85:15.

The process of producing the polyisocyanate compositions of the present invention comprises
(A) mixing:
(1) from about 70 to about 99%, preferably from about 85 to about 95%, by weight of a polymethylene poly (phenyl isocyanate) having an NCO group content of from about 30 to about 33% by weight, and a monomer content of from about 40 to about 90% by weight; and
(2) from about 1 to about 30%, preferably from about 5% to about 15%, by weight of a prepolymer of diphenylmethane diisocyanate having an NCO group content of from about 2 to about 20% by weight;
at temperatures of from about 30 to 60° C. and ambient pressure. Prior to mixing of the prepolymer, i.e. component (A)(2) with the polyisocyanate component, i.e. component (A)(1), the prepolymer should be heated under nitrogen to about 50–60° C., if the viscosity of the prepolymer is too high for mixing at room temperature.

Suitable prepolymers of diphenylmethane diisocyanate and suitable polymethylene poly(phenyl isocyanates) are as described hereinabove. The prepolymers, i.e component (2) above, are prepared by prepolymerization of the isocyanate and polyol components using techniques and methods known in the field of polyurethane chemistry.

The present invention also relates to a process for the production of a cold cure flexible molded foam. This process comprises:
(I) reacting:
(A) the polyisocyanate composition having an NCO group content of more than about 15% which comprises:
(1) from about 70 to about 99% by weight of a polymethylene poly(phenyl isocyanate) having an NCO group content of about 30 to about 33%, and a monomer content of from about 40 to about 90% by weight, and
(2) from about 1 to about 30% by weight, of a prepolymer of diphenylmethane diisocyanate having an NCO group content of from about 2% to about 20%, and which comprises the reaction product of:
(a) diphenylmethane diisocyanate, and
(b) at least one polyether polyol; with
(B) an isocyanate-reactive component comprising:
(1) at least one polyether polyol having a molecular weight of 400 to 14,000, a number average functionality of 2 to 6, and an OH number of about 10 to about 850; and, optionally,
(2) a low molecular weight isocyanate-reactive component capable of chain extending and/or crosslinking, and which contains from 2 to 6 reactive groups capable of reacting with isocyanate groups, and having a molecular weight of 32 to 399;
in the presence of
(C) at least one blowing agent comprising water;
and, optionally,
(D) one or more additives.

In this process, the total amount of water present is from about 1% to about 10% by weight, preferably from about 2% to about 6% by weight, based on the total weight of component (B)(1). The relative amounts of (A) the polyisocyanate composition, and the combined amounts of (B) the isocyanate-reactive component, (C) the blowing agent and (D) any additives are such that the Isocyanate Index (NCO Index) of this process is from 70 to 120, preferably from 80 to 110, and most preferably from 90 to 105.

In the process of producing the cold cure flexible molded foams and the resultant foams produced by this process, the following components are suitable. The polyisocyanate composition is as described hereinabove.

Suitable isocyanate-reactive components to be used as component (B) in this process include (1) one or more polyether polyols having a molecular weight of 400 to 14,000, a number average functionality of 2 to 6, and an OH number of about 10 to about 850; and (2) one or more low molecular weight organic compounds containing isocyanate-reactive groups and that is capable of chain extending and/or crosslinking. These low molecular weight compounds generally contain from 2 to 6 isocyanate-reactive groups and have molecular weights of from 32 to 399.

Suitable polyether polyols to be used as component (B)(1) in the present invention include, for example, the high molecular weight polyethers which are known and may be obtained, for example, by polymerizing epoxides such as ethylene oxide, propylene oxide, butylene oxide, tetrahydrofuran, styrene oxide or epichlorohydrin, in the presence of, for example, $BF_3$, KOH, double metal cyanide, or other suitable alkoxylation catalyst; or by chemically adding these epoxides, preferably ethylene oxide and propylene oxide, in admixture or successively to components containing reactive hydrogen atoms such as water, alcohols or amines. Examples of alcohols and amines include ethylene glycol, 1,3- and 1,2-propylene glycol, trimethylol propane, glycerol, etc. Also suitable are the polyethers containing high molecular weight polyadducts and polycondensates or polymers in finely dispersed or dissolved form. Such polyethers may be obtained by polyaddition reactions (for example, reactions between polyisocyanates and aminofunctional compounds) and polycondensation reactions (for example, between formaldehyde and phenols and/or amines) in situ in the above described polyethers, Such processes are described in German Auslegeschriften No. 1,168,075 and 1,260,142, and in German Offenlegungsschriften Nos. 2,324,134, 2,423,984, 2,512,385, 2,513,815, 2,550,796, 2,550,797, 2,550,833, 2,550,862, 2,633,293, and 2,639,254. See also U.S. Pat. Nos. 3,325,421, 4,042,537, 4,089,835, 4,293,470, 4,296,213, and 4,374,209, the disclosures of which are herein incorporated by reference. Also useful are the so-called polymer polyols obtained by polymerizing one or more ethylenically unsaturated monomers in a polyether. Such polymer polyols are described in, for example, U.S. Pat. Nos. 3,383,351, 3,304,273, 3,523,093, 3,110,685 and RE 28,715 and 29,118, the disclosures of which are herein incorporated by reference. Polymer polyols are commercially available from Bayer AG, BASF, and Union Carbide. Regardless of the specific polyether used herein, it is generally preferred to use polyethers containing primary hydroxyl groups.

It is also possible to use any of the low molecular weight chain extenders and crosslinking agents set forth hereinafter as suitable starters for the high molecular weight polyether polyol component (B)(1), with the proviso that these correspond to the molecular weight, functionality and OH number limitations as set forth above. Some examples of these include compounds such as, 4,4'-dihydroxy diphenyl propane, sucrose, aniline, ammonia, ethanolamine, ethylene diamine, propylene glycol, ethylene glycol, glycerin, etc. Also suitable are polybutadienes containing OH groups.

These polyether polyols for (B)(1) of the present invention preferably have a nominal functionality of about 2 to about 4, a molecular weight of about 1,000 to about 6,000, and an OH number of about 18 to about 225.

Suitable compounds to be used as component (B)(2), i.e. the low molecular weight organic compounds capable of chain extension and/or crosslinking include, for example, compounds containing from 2 to 8 isocyanate-reactive groups, and having a molecular weight of 32 to 399. It is preferred that these compounds have from 2 to 6 isocyanate-reactive groups, and have a molecular weight of from 60 to 350. Examples of suitable hydroxyl group-containing chain extenders include ethylene glycol, 1,2- and 1,3-propylene diol, 1,3- and 1,4- and 2,3-butane diol, 1,6-hexane diol, 1,10-decane diol, diethylene glycol, triethylene glycol, tetraethylene glycol, dipropylene glycol, tripropylene glycol, glycerol, trimethylol propane, monoethanolamine, diethanolamine, triethanolamine, propylene oxide adducts of ethylene diamine, etc. In general, chain extending and/or crosslinking agents are present in amounts of from about 0% to about 10%, preferably from about 0% to about 3% by weight, based on the total weight of the isocyanate-reactive component.

Suitable blowing agents for the foams of this invention comprise water. In general, the total amount of water used as a blowing agent is from about 2% to about 6% by weight, preferably from about 2% to about 4% by weight, based on the total weight of component (B)(1). In addition to water, it is possible that other blowing agents may also be used. Examples of other suitable blowing agents include compounds such as halogenated hydrocarbons, low boiling solvents such as, for example, pentane, and other known blowing agents. Water is preferably used as the sole blowing agent in the present invention.

It is also possible to use gaseous or liquefied carbon dioxide as a blowing agent. The carbon dioxide is either dissolved in components (A) the polyisocyanate composition and/or (B) the isocyanate-reactive component, or added to the reacting mixture of (A) and (B) during the mixing step.

It is also possible that various additives and/or auxiliary agents may be included in the formulation. Examples of such additives and/or auxiliary agents include catalysts, surface-active additives such as, for example, emulsifiers and foam stabilizers, internal mold release agents, pigments, cell regulators, flame retarding agents, plasticizers, dyes, fillers and reinforcing agents such as glass in the form of fibers or flakes or carbon fibers.

Catalysts suitable to be used in accordance with the present invention include, for example, various organic metal compounds, including, for example, tin(II) salts of carboxylic acids, dialkyl tin salts of carboxylic acids, dialkyl tin mercaptides, dialkyl tin dithioesters and amines, such as, for example, dimethylcyclohexylamine (i.e., Polycat® 8), pentamethyldiethylenetriamine (i.e., Polycat® 5), bis[2-dimethylamino-ethyl]ether (Niax A®-1), dimethylethanolamine (DMEA), Dabco® WT, triethylene diamine (Dabco® 33LV), pentamethyldipropylene triamine (Polycat® 77), dimethylaminopropylamine (DMAPA), bis(dimethylaminopropylamine) (Polycat® 15), etc. Of course, it is also possible to use any of the catalysts which are well known to those skilled in the art of polyurethane chemistry. It is preferred to use amines as the catalysts in the present invention.

Some examples of suitable additives include surface-active additives such as emulsifiers and foam stabilizers. Examples of these include N-stearyl-N',N'-bis-hydroxyethyl urea, oleyl polyoxyethylene amide, stearyl diethanol amide, isostearyl diethanol amide, polyoxyethylene glycol monoleate, a pentaerythritol/adipic acid:oleic acid ester, a hydroxy ethyl imidazole derivative of oleic acid, N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may be used as surface-active additives.

Suitable foam stabilizers include polyether siloxanes. The structure of these compounds is generally such that a copolymer of ethylene oxide and propylene oxide is attached to a polydimethyl siloxane radical. Such foam stabilizers are described in U.S. Pat. No. 2,764,565. It is preferred to use weak surfactants in the present invention, in amounts of from about 0.3 to about 3% by weight, more preferably in amounts of from about 0.5 to about 2% by weight (based on the weight of the high molecular weight polyether polyol component). Preferred commercially available surfactants include the silicone surfactants B-4690 and B-4113, which are available from Goldschmidt.

The compositions according to the present invention may be molded using conventional processing techniques at isocyanate indexes ranging from about 70 to 120 (preferably from 80 to 110, and most preferably from 90 to 105). By the term "Isocyanate Index" (also commonly referred to as "NCO index"), is defined herein as the equivalents of isocyanate, divided by the total equivalents of isocyanate-reactive hydrogen containing materials, multiplied by 100. When water is present as some or all of the blowing agent, the quantity of water present is considered in calculating the isocyanate index.

According to the invention, the components may be reacted together by known processes often using mechanical devices such as those described in U.S. Pat. No. 2,764,565, the disclosure of which is herein incorporated by reference. Details concerning processing apparatus which may be used according to the invention may be found in Kunststoff-Handbuch, Volume VII, published by Vieweg and Hochtlen, Carl-Hanser-Verlag, Munich, 1966, pp. 121 and 205.

In accordance with the present invention, the foaming reaction for producing foam products is often carried out inside molds. In the process, the foamable reaction mixture is introduced into a mold which may be made of a metal such as aluminum or a plastics material such as an epoxide resin. The reaction mixture foams up inside the mold to produce the shaped product. The process of foaming in molds is carried out to produce a product having a cellular structure on its surface. According to the invention, the desired result can be obtained by introducing just sufficient foamable reaction mixture to fill the mold with foam after the reaction is completed.

So-called external mold release agents known in the art, such as silicone waxes and oils, are frequently used when foaming is carried out inside the molds. The process may also be carried out with the aid of so-called internal mold release agents, if desired, in combination with external mold release agents, e.g., described in German Offenlegungsschriften Nos. 2,121,670 and 2,307,589.

Cold setting foams may also be produced, as described in British Patent No. 1,162,517 and German Offenlegungsschriften No. 2,153,086.

Foams may, of course, also be produced by the process of block foaming or by the laminator process known in the art. The products obtainable according to the invention may be used, for example, as upholstery or padding materials.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following components were used in the working examples of the present invention.

Polymer Polyol A: a styrene-acrylonitrile (SAN) filled polypropyleneoxide-polyethylene oxide polyether polyol having a nominal functionality of about 3, a molecular weight of about 4,800 g/mol, and containing about 43% by weight solids.

Polyether Polyol A: polypropyleneoxide-polyethyleneoxide-polyether-polyol started from glycerin, and characterized by a nominal functionality of 3 and molecular weight of about 6,000 g/mol.

Crosslinker A: diethanolamine

Surfactant A: Tegostab® B4690, commercially available from Goldschmidt

Surfactant B: Tegostab® B-8681, commercially available from Goldschmidt

Surfactant C: Tegostab® B-4113, commercially available from Goldschmidt

Catalyst A: Dabco® 33-LV, 33% triethylene diamine in dipropylene glycol, commercially available from Air Products Catalyst B: Dabco® 8154, a delayed action gelation catalyst, commercially available from Air Products Catalyst C: NIAX® A-1, 70% bis(dimethylaminoethyl)ether and 30% dipropylene glycol, commercially available from OSi/Witco Polyol Blend 1: comprised a mixture of:
  Polymer Polyol A: 20 pbw
  Polyether Polyol A: 80 pbw
  Crosslinker A: 0.95 pbw
  Water: 2.70 pbw
  Surfactant A: 0.5 pbw
  Surfactant B: 0.2 pbw
  Catalyst A: 0.2 pbw
  Catalyst B: 0.2 pbw
  Catalyst C: 0.08 pbw Isocyanate 1: Polymeric MDI having an NCO group content of about 32.5%, and with a monomer content of about 83% based on total weight, wherein about 72% is 4,4'-isomer of MDI, about 27% is the 2,4'-isomer of MDI, and about 1% is the 2,2'-isomer of MDI, based on the total weight of the monomer. This isocyanate contains about 17% by weight of higher ring oligomers of MDI.

Prepolymer 1: Comparative Prepolymer (i.e., state-of-the art as described in U.S. Pat. No. 5,877,227). A polyisocyanate mixture having an NCO group content of about 28.0%, and containing about 72% by weight of monomeric MDI, based on the total weight of the prepolymer (i.e., components (i) and (ii) as described below). Of this monomeric MDI content, about 76% is the 4,4'-isomer, about 24% is the 2,4'-isomer and about 0.2% is the 2,2'-isomer, based on 100% by wt. of monomer. This polyisocyanate mixture was prepared by reacting:

(i) a semi-prepolymer having an NCO group content of about 27% by weight and which comprised the reaction product of:
  (a) 30.8 pbw of a monomeric 4,4'-diphenylmethane diisocyanate having less than 2% by wt. of the 2,4'-isomer of MDI,
  (b) 30.8 pbw of a monomeric MDI containing about 45% by wt. of the 4,4'-isomer of MDI, about 53% by wt. of the 2,4'-isomer of MDI and about 2% by wt. of the 2,2'-isomer of MDI, and
  (c) 13.6 pbw of a glycerin started polypropyleneoxide-polyethyleneoxide polyether polyol having a nominal functionality of 3 and an ethylene oxide content of about 45%,
  with
(ii) 25 parts of a polymeric MDI having an NCO group content of about 31.5%, and a monomeric MDI content of about 45% by weight. The monomer content of the polymeric MDI component consisted of about 94.5% by weight of the 4,4'-isomer of MDI, about 5.5% by weight of the 2,4'-isomer of MDI and less than 0.1% by weight of the 2,2'-isomer of MDI.

Prepolymer 2: Prepolymer which corresponds to component (2) of claim 1. A polyisocyanate prepolymer having an NCO group content of about 9.5% by weight and a viscosity of about 4,000 mPa.s at 25° C. This prepolymer was prepared by prepolymerizing:

(i) monomeric MDI containing less than 2% by weight of the 2,4'-isomer of MDI and less than 0.1% by weight of the 2,2'-isomer of MDI, with the balance being the 4,4'-isomer of MDI,
  with
(ii) a glycerin started polypropyleneoxide-polyethyleneoxide-block copolyether polyol having a nominal functionality of 3, a molecular weight of about 4,500 g/mol, and an ethylene oxide content of about 70% by weight (based on the combined weight of propylene oxide and ethylene oxide).

Polyisocyanates were prepared from Isocyanate 1 and Prepolymer 2 by the following procedure. These polyisocyanates are representative of the presently claimed invention.

First, the appropriate quantity of Prepolymer 2 was added to a flask, followed by heating the prepolymer to about 50° C. The appropriate quantity of the heated prepolymer was added to Isocyanate 1, and thoroughly mixed. The mixture was kept under dry nitrogen and was allowed to cool to room temperature.

The following table shows the relative amounts of Isocyanate 1, Prepolymer 2, and the NCO content of the resultant Polyisocyanate Mixtures that were prepared in accordance with the present invention.

TABLE 1

Polyisocyanate Mixtures of the Invention

|  | Polyisocyanate Mixture 1 | Polyisocyanate Mixture 2 | Polyisocyanate Mixture 3 |
|---|---|---|---|
| Isocyanate 1 (pbw) | 95 | 90 | 80 |
| Prepolymer 2 (pbw) | 5 | 10 | 20 |
| % NCO content | 31.4% | 30.2% | 28.1% |

TABLE 2

| Foam Formulation and Properties | Comparison Example 1 | Example 2 | Example 3 | Example 4 |
|---|---|---|---|---|
| Polyol Blend 1 (pbw) | 100 | 100 | 100 | 100 |
| Polyisocyanate Mixture 1 (pbw) |  | 48.3 |  |  |
| Polyisocyanate Mixture 2 (pbw) |  |  | 50.2 |  |
| Polyisocyanate Mixture 3 (pbw) |  |  |  | 54.0 |
| Prepolymer 1 (pbw) | 54.1 |  |  |  |
| % NCO Isocyanate | 28.0% | 31.4% | 30.2% | 28.1% |
| Isocyanate Index | 100 | 100 | 100 | 100 |
| Molded Foam Density (kg/m$^3$) | 55 | 55 | 55 | 55 |
| Foam Density (kg/m$^3$) | 56.0 | 56.6 | 56.2 | 56.7 |
| ILD 25% R | 224 | 264 | 239 | 223 |
| CFD 40% | 6.7 | 8.8 | 7.8 | 6.7 |
| Elongation (%) | 80 | 109 | 101 | 92 |
| Resilience (%) | 59 | 58 | 59 | 59 |
| Tear Strength (N/m) | 198 | 264 | 239 | 223 |
| Tensile Strength (kPa) | 106 | 150 | 127 | 100 |
| Compression Set (50% ct) | 6.9 | 6.5 | 5.8 | 5.3 |
| Humid Aged Compression Set (50% ct)* | 8.4 | 10 | 7.7 | 6.8 |

*VW specification PV3410/TL544

The foams produced in Examples 2, 3, and 4 exhibited lower (i.e., improved) compression sets and humid aged compression sets in comparison to the foam produced in Example 1.

The foam produced in Example 4 also exhibited a higher (i.e., improved) elongation and higher (i.e., improved) tear strength in comparison to the foam produced in Example 1 at the same % NCO of the isocyanate component, and at the same hardness level as the foam 1 of Comparison Example 1 (ILD, CFD 40).

The foams produced in Examples 2 and 3 exhibited higher (i.e., improved) elongations, higher (i.e., improved) tear strengths and higher (i.e., improved) tensile strengths, in addition to the improved (i.e., lower) compression sets, and the higher hardness (ILD, CFD 40), in comparison to the foam produced in Comparison Example 1.

As the foam of Example 4, the foam of Example 3 also exhibits lower (i.e., improved) humid aged compression set as the foam of Comparison Example 1, but at a higher hardness level (ILD, CFD 40), and with improved elongation, tear and tensile strength. This result was achieved at a higher %NCO value of the isocyanate component, i.e., less isocyanate was used to make the foam at the same index.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyisocyanate composition having an NCO group content of more than about 15% and comprising:
   (1) from about 70 to 99% by weight, based on 100% by weight of (1) and (2), of a polymethylene poly(phenyl isocyanate) having an NCO group content of from about 30 to about 33%, and a monomer content of from about 40% to about 90% by weight, wherein the monomer comprises less than about 8% of 2,2'-diphenylmethane diisocyanate, from about 10 to about 50% of 2,4'-diphenylmethane diisocyanate and from about 50 to about 90% of 4,4'-diphenylmethane diisocyanate, with the %'s by weight of the 2,2'-, 2,4'- and 4,4'-isomer of diphenylmethane diisocyanate totaling 100% by weight of the monomer content; and
   (2) from about 1 to about 30% by weight, based on 100% by weight of (1) and (2), of a prepolymer of diphenylmethane diisocyanate having an NCO group content of from about 2% to about 20%, and comprising the reaction product of:
      (a) diphenylmethane diisocyanate comprising no more than about 3% by weight of the 2,2'-isomer, from about 0.1 to about 60% by weight of the 2,4'-isomer and from about 40 to about 99.9% by weight of the 4,4'-isomer, with the %'s by weight of the 2,2'-, 2,4'- and 4,4'-isomers totaling 100% by weight; and
      (b) a polyether polyol having a functionality of at least 2, a molecular weight of 500 to 10,000, and an OH number of 10 to 400, and being prepared by reacting a suitable initiator compound with ethylene oxide and propylene oxide in a weight ratio of EO:PO of 50:50 to 90:10.

2. The polyisocyanate composition of claim 1, wherein the NCO group content is from about 20% to less than about 33%, and comprising:
   (1) from about 85 to 95% by weight, based on 100% by weight of (1) and (2), of a polymethylene poly(phenyl isocyanate) having an NCO group content of from about 31 to about 33%, and a monomer content of from about 60% to about 90% by weight, wherein the monomer comprises less than about 2% of 2,2'-diphenylmethane diisocyanate, from about 15 to about 35% of 2,4'-diphenylmethane diisocyanate and from about 63 to about 85% of 4,4'-diphenylmethane diisocyanate, with the %'s by weight of the 2,2'-, 2,4'- and 4,4'-isomer of diphenylmethane diisocyanate totaling 100% by weight of the monomer content; and
   (2) from about 5 to about 15% by weight, based on 100% by weight of (1) and (2), of a prepolymer of diphenylmethane diisocyanate having an NCO group content of from about 5% to about 15%, and comprising the reaction product of:
      (a) diphenylmethane diisocyanate comprising no more than about 3% by weight of the 2,2'-isomer, from about 0.1 to about 60% by weight of the 2,4'-isomer and from about 40 to about 99.9% by weight of the 4,4'-isomer, with the %'s by weight of the 2,2'-, 2,4'- and 4,4'-isomers totaling 100% by weight; and
      (b) a polyether polyol having a functionality of from about 3 to about 6, a molecular weight of 1,000 to 6,000, and an OH number of 20 to 200, and being prepared by reacting a suitable initiator compound with ethylene oxide and propylene oxide in a weight ratio of EO:PO of 60:40 to 90:10.

3. The polyisocyanate composition of claim 2, wherein the NCO group content is from about 25% to about 32%, and comprising:
   (1) a polymethylene poly(phenyl isocyanate) having a monomer content of from about 70% to about 85% by weight; and
   (2) a prepolymer of diphenylmethane diisocyanate, comprising the reaction product of:
      (a) diphenylmethane diisocyanate; and
      (b) a polyether polyol being prepared by reacting a suitable initiator compound with ethylene oxide and propylene oxide in a weight ratio of 65:35 to 85:15.

4. A process for the preparation of a polyisocyanate composition having an NCO group content of more than about 15%, comprising:
(A) mixing
   (2) from about 1 to about 30% by weight, based on 100% by weight of (1) and (2), of a prepolymer of diphenylmethane diisocyanate having an NCO group content of from about 2% to about 20%, which comprises the reaction product of:
      (a) diphenylmethane diisocyanate comprising no more than about 3% by weight of the 2,2'-isomer, from about 0.1 to about 60% by weight of the 2,4'-isomer and from about 40 to about 99.9% by weight of the 4,4'-isomer, with the %'s by weight of the 2,2'-, 2,4'- and 4,4'-isomers totaling 100% by weight; and
      (b) a polyether polyol having a functionality of at least 2, a molecular weight of 500 to 10,000, and an OH number of 10 to 400, and being prepared by reacting a suitable initiator compound with ethylene oxide and propylene oxide in a weight ratio of EO:PO of 50:50 to 90:10; with
   (1) from about 70 to 99% by weight, based on 100% by weight of (1) and (2), of a polymethylene poly(phenyl isocyanate) having an NCO group content of from about 30 to about 33%, and a monomer content of from about 40% to about 90% by weight, wherein the monomer comprises less than about 8% of 2,2'-diphenyl-methane diisocyanate, from about 10 to about 50% of 2,4'-diphenylmethane diisocyanate and from about 50 to about 90% of 4,4'-diphenyl-methane diisocyanate, with the %'s by weight of the 2,2'-, 2,4'- and 4,4'-isomer of diphenylmethane diisocyanate totaling 100% by weight of the monomer content;
at temperatures of from about 30 to 60° C. and ambient pressure.

5. The process of claim 4, wherein (A)(2) said prepolymer of diphenylmethane diisocyanate is heated under nitrogen to about 50 to 60° C. prior to mixing with (A)(1) said polyisocyanate component.

6. The process of claim 5, wherein the (A)(2) said prepolymer of diphenylmethane diisocyanate is heated under dry nitrogen.

7. The process of claim 4, wherein said polyisocyanate composition has an NCO group content of from about 20% to less than about 33% and comprising:
(A) mixing
   (2) from about 5 to about 15% by weight, based on 100% by weight of (1) and (2), of a prepolymer of diphenylmethane diisocyanate having an NCO group content of from about 5% to about 15%, which comprises the reaction product of:
      (a) diphenylmethane diisocyanate comprising no more than about 3% by weight of the 2,2'-isomer, from about 0.1 to about 60% by weight of the 2,4'-isomer and from about 40 to about 99.9% by weight of the 4,4'-isomer, with the %'s by weight of the 2,2'-, 2,4'- and 4,4'-isomers totaling 100% by weight; and
      (b) a polyether polyol having a functionality of from about 3 to about 6, a molecular weight of 1,000 to 6,000, and an OH number of 20 to 200, and being prepared by reacting a suitable initiator compound with ethylene oxide and propylene oxide in a weight ratio of EO:PO of 60:40 to 90:10; with
   (1) from about 85 to 95% by weight, based on 100% by weight of (1) and (2), of a polymethylene poly(phenyl isocyanate) having an NCO group content of from about 31 to about 33%, and a monomer content of from about 60% to about 90% by weight, wherein the monomer comprises less than about 2% of 2,2'-diphenyl-methane diisocyanate, from about 15 to about 35% of 2,4'-diphenylmethane diisocyanate and from about 63 to about 85% of 4,4'-diphenyl-methane diisocyanate, with the %'s by weight of the 2,2'-, 2,4'- and 4,4'-isomer of diphenylmethane diisocyanate totaling 100% by weight of the monomer content.

8. The process of claim 7, wherein the NCO group content is from about 25% to about 32% and comprising:
(A) mixing
   (2) a prepolymer of diphenylmethane diisocyanate comprising the reaction product of:
      (a) diphenylmethane diisocyanate; and
      (b) a polyether polyol being prepared by reacting a suitable initiator compound with ethylene oxide and propylene oxide in a weight ratio of 65:35 to 85:15.

9. A process for the production of a cold-cure molded flexible polyurethane foam comprising:
(I) reacting
   (A) a polyisocyanate composition having an NCO group content of more than about 15%, which comprises:
      (1) from about 70 to 99% by weight, based on 100% by weight of (1) and (2), of a polymethylene poly (phenyl isocyanate) having an NCO group content of from about 30 to about 33%, and a monomer content of from about 40% to about 90% by weight, wherein the monomer comprises less than about 8% of 2,2'-diphenylmethane diisocyanate, from about 10 to about 50% of 2,4'-diphenylmethane diisocyanate and from about 50 to about 90% of 4,4'-diphenylmethane diisocyanate, with the %'s by weight of the 2,2'-, 2,4'- and 4,4'-isomer of diphenylmethane diisocyanate totaling 100% by weight of the monomer content; and
      (2) from about 1 to about 30% by weight, based on 100% by weight of (1) and (2), of a prepolymer of diphenyl-methane diisocyanate having an NCO group content of from about 2% to about 20%, and comprising the reaction product of:
         (a) diphenylmethane diisocyanate comprising no more than about 3% by weight of the 2,2'-isomer, from about 0.1 to about 60% by weight, of the 2,4'-isomer and from about 40 to about 99.9% by weight of the 4,4'-isomer, with the %'s by weight of the 2,2'-, 2,4'- and 4,4'-isomers totaling 100% by weight; and
         (b) a polyether polyol having a functionality of at least 2, a molecular weight of 500 to 10,000, and an OH number of 10 to 400, and being prepared by reacting a suitable initiator compound with ethylene oxide and propylene oxide in a weight ratio of EO:PO of 50:50 to 90:10; and
(B) an isocyanate-reactive component comprising:
(1) at least one polyether polyol having a molecular weight of 400 to 14,000 and a number average functionality of 2 to 6; and, optionally,
(2) one or more chain extenders and/or crosslinking agents containing from 2 to 6 reactive groups capable of reacting with isocyanate groups, and having a molecular weight of 32 to 399; in the presence of
(C) a blowing agent comprising water, and, optionally,
(D) one or more additives;
wherein the total amount of water present is from about 1 to about 10% by weight, based on the total weight of (B)(1), and wherein the relative amounts of components (A), (B), (C) and, optionally (D) are such that the isocyanate index is from 70 to 120.

10. The process of claim 9, wherein (A) said polyisocyanate composition has an NCO group content of from about 20% to less than about 33% and comprising:
(1) from about 85 to 95% by weight, based on 100% by weight of (1) and (2), of a polymethylene poly(phenyl isocyanate) having an NCO group content of from about 31 to about 33%, and a monomer content of from about 60% to about 90% by weight, wherein the monomer comprises less than about 2% of 2,2'-diphenylmethane diisocyanate, from about 15 to about 35% of 2,4'-diphenylmethane diisocyanate and from about 63 to about 85% of 4,4'-diphenylmethane diisocyanate, with the %'s by weight of the 2,2'-, 2,4'- and 4,4'-isomer of diphenylmethane diisocyanate totaling 100% by weight of the monomer content; and
(2) from about 5 to about 15% by weight, based on 100% by weight of (1) and (2), of a prepolymer of diphenylmethane diisocyanate having an NCO group content of from about 5% to about 15%, and comprising the reaction product of:
(a) diphenylmethane diisocyanate comprising no more than about 3% by weight of the 2,2'-isomer, from about 0.1 to about 60% by weight of the 2,4'-isomer and from about 40 to about 99.9% by weight of the 4,4'-isomer, with the %'s by weight of the 2,2'-, 2,4'- and 4,4'-isomers totaling 100% by weight; and
(b) a polyether polyol having a functionality of from about 3 to about 6, a molecular weight of 1,000 to 6,000, and an OH number of 20 to 200, and being prepared by reacting a suitable initiator compound with ethylene oxide and propylene oxide in a weight ratio of EO:PO of 60:40 to 90:10.

11. The process of claim 10, wherein (A) said polyisocyanate composition has an NCO group content of from about 25% to about 32% and comprising:
(1) a polymethylene poly(phenyl isocyanate) having a monomer content of from about 70% to about 85% by weight; and
(2) a prepolymer of diphenylmethane diisocyanate, comprising the reaction product of:
(a) diphenylmethane diisocyanate; and
(b) a polyether polyol being prepared by reacting a suitable initiator compound with ethylene oxide and propylene oxide in a weight ratio of 65:35 to 85:15.

12. The process of claim 9, wherein (B) said isocyanate-reactive component comprises:
(1) at least one polyether polyol having a molecular weight of 1,000 to 6,000 and a number average functionality of 2 to 4; and, optionally,
(2) one or more chain extenders and/or crosslinking agents containing from 2 to 4 reactive groups capable of reacting with isocyanate groups and having a molecular weight of 32 to 399.

13. The process of claim 9, wherein the total amount of water present in from about 2 to about 6% by weight, based on the total weight of (B)(1).

14. The process of claim 9, wherein the relative amounts of components (A), (B), (C) and (D) are such that the isocyanate index is from 80 to 110.

15. The process of claim 9, wherein the relative amounts of components (A), (B), (C) and (D) are such that the isocyanate index is from 90 to 105.

16. A cold-cure molded flexible foam comprising the reaction product of:
(A) a polyisocyanate composition having an NCO group content of more than about 15%, which comprises:
(1) from about 70 to 99% by weight, based on 100% by weight of (1) and (2), of a polymethylene poly(phenyl isocyanate) having an NCO group content of from about 30 to about 33%, and a monomer content of from about 40% to about 90% by weight, wherein the monomer comprises less than about 8% of 2,2'-diphenylmethane diisocyanate, from about 10 to about 50% of 2,4'-diphenylmethane diisocyanate and from about 50% to about 90% of 4,4'-diphenyl-methane diisocyanate, with the %'s by weight of the 2,2'-, 2,4'- and 4,4'-isomer of diphenylmethane diisocyanate totaling 100% by weight of the monomer content; and
(2) from about 1 to about 30% by weight, based on 100% by weight of (1) and (2), of a prepolymer of diphenylmethane diisocyanate having an NCO group content of from about 2% to about 20%, and comprises the reaction product of:
(a) diphenylmethane diisocyanate comprising no more than about 3% by weight of the 2,2'-isomer, from about 0.1 to about 60% by weight of the 2,4'-isomer and from about 40 to about 99.9% by weight of the 4,4'-isomer; with the %'s by weight of the 2,2'-, 2,4'- and 4,4'-isomers totaling 100% by weight; and
(b) a polyether polyol having a functionality of at least 2, a molecular weight of 500 to 10,000, and an OH number of 10 to 400, and being prepared by reacting a suitable initiator compound with ethylene oxide and propylene oxide in a weight ratio of EO:PO of 50:50 to 90:10; and
(B) an isocyanate-reactive component comprising:
(1) at least one polyether polyol having a molecular weight of 400 to 14,000 and a number average functionality of 2 to 6; and, optionally,
(2) one or more chain extenders and/or crosslinking agents containing from 2 to 6 reactive groups capable of reacting with isocyanate groups, and having a molecular weight of 32 to 399;
in the presence of
(C) a blowing agent comprising water, and, optionally,
(D) one or more additives;
wherein the total amount of water present is from about 1 to about 10% by weight, based on the total weight of (B)(1), and wherein the relative amounts of components (A), (B) and (C) being such that the isocyanate index is from 70 to 120.

17. The cold-cure molded flexible foam of claim 16, wherein (A) said polyisocyanate composition has an NCO group content of from about 20% to less than about 33% and comprises:
(1) from about 85 to 95% by weight, based on 100% by weight of (1) and (2), of a polymethylene poly(phenyl isocyanate) having an NCO group content of from about 31 to about 33%, and a monomer content of from about 60% to about 90% by weight, wherein the monomer comprises less than about 2% of 2,2'-diphenylmethane diisocyanate, from about 15 to about 35% of 2,4'-diphenylmethane diisocyanate and from about 63 to about 85% of 4,4'-diphenylmethane diisocyanate, with the %'s by weight of the 2,2'-, 2,4'- and 4,4'-isomer of diphenylmethane diisocyanate totaling 100% by weight of the monomer content; and (2) from about 5 to about 15% by weight, based on 100% by weight of (1) and (2), of a prepolymer of diphenylmethane diisocyanate having an NCO group content of from about 5% to about 15%, and comprising the reaction product of:
  (a) diphenylmethane diisocyanate comprising no more than about 3% by weight of the 2,2'-isomer, from about 0.1 to about 60% by weight of the 2,4'-isomer and from about 40 to about 99.9% by weight of the 4,4'-isomer, with the %'s by weight of the 2,2'-, 2,4'- and 4,4'-isomers totaling 100% by weight; and
  (b) a polyether polyol having a functionality of from about 3 to about 6, a molecular weight of 1,000 to 6,000, and an OH number of 20 to 200, and being prepared by reacting a suitable initiator compound with ethylene oxide and propylene oxide in a weight ratio of EO:PO of 60:40 to 90:10.

18. The cold-cure molded flexible foam of claim 17, wherein (A) said polyisocyanate composition has an NCO group content of from about 25% to about 32% and comprises:

(1) a polymethylene poly(phenyl isocyanate) having a monomer content of from about 70% to about 85% by weight; and (2) a prepolymer of diphenylmethane diisocyanate, comprising the reaction product of:
  (a) diphenylmethane diisocyanate; and
  (b) a polyether polyol being prepared by reacting a suitable initiator compound with ethylene oxide and propylene oxide in a weight ratio of 65:35 to 85:15.

19. The cold-cure molded flexible foam of claim 16, wherein (B) said isocyanate-reactive component comprises:

(1) at least one polyether polyol having a molecular weight of 1,000 to 6,000 and a number average functionality of 2 to 4; and, optionally, (2) one or more chain extenders and/or crosslinking agents containing from 2 to 4 reactive groups capable of reacting with isocyanate groups and having a molecular weight of 32 to 399.

20. The cold-cure molded flexible foam of claim 16, wherein the total amount of water present in from about 2 to about 6% by weight, based on the total weight of (B)(1).

21. The cold-cure molded flexible foam claim 16, wherein the relative amounts of components (A), (B), (C) and (D) are such that the isocyanate index is from 80 to 110.

22. The cold-cure molded flexible foam claim 16, wherein the relative amounts of components (A), (B), (C) and (D) are such that the isocyanate index is from 90 to 105.

* * * * *